Patented June 13, 1944

2,351,118

UNITED STATES PATENT OFFICE 2,351,118

COLORING MATTERS OF THE PHTHALOCYANINE SERIES

Norman Hulton Haddock, Blackley, Manchester, England, assignor to Imperial Chemical Industries Limited, a corporation of Great Britain No Drawing. Application July 15, 1942, Serial No. 451,075. In Great Britain June 6, 1939

11 Claims. (Cl. 260—146)

This application is a continuation-in-part of my copending application, Serial No. 335,872, filed May 17, 1940.

This invention relates to new coloring matters of the phthalocyanine series. More particularly, this invention deals with primary polyazo compounds of the phthalocyanine series, useful as direct dyestuffs for cotton and further useful for conversion into pigments.

In an earlier application of mine, Serial No. 335,871, filed May 17, 1940 (now Patent No. 2,280,072, issued April 21, 1942), I have described a novel method for producing metal-free and metallic tetra-amino-phthalocyanines, obtained by reduction of the corresponding tetranitro-phthalocyanines.

As typical tetranitro-phthalocyanines which may be economically employed for this purpose, there were mentioned copper-tetra-(4)-nitro-phthalocyanine, copper-tetra-(3)-nitro-phthalocyanine, mixtures of these; other metallic tetranitro-phthalocyanines for instance those of cobalt, nickel, aluminum, lead or magnesium; and also metal-free tetranitro-phthalocyanine.

The tetra-amines thus obtained were described as generally green in color and insoluble in water. They are turned blue by the action of acids, for example hydrochloric acid, seemingly owing to salt formation. When subjected to the action of nitrous acid, they are readily diazotized, and in this form are useful as intermediates, namely diazo components, in the preparation of coloring matters.

In a similar manner, phthalocyanines having three or two diazonium groups may be prepared by starting with the corresponding trinitro and dinitro-phthalocyanines. These in turn may be prepared by synthesizing phthalocyanines from the preferred metal, say copper or cobalt, on the one hand and from a mixture of phthalonitrile and nitrophthalonitrile (in molal ratio 1:3 or 2:2, respectively) on the other hand. Also, by starting with a tetranitro-phthalocyanine and reducing to a tetra-amino compound but using then a limited quantity of nitrous acid, phthalocyanine compounds containing less than four diazo groups per molecule may be produced.

Now, according to my present invention, the above tetra-, tri- or di-didiazo-phthalocyanine compounds, hereinafter referred to generically as polydiazo-phthalocyanines, may be converted into valuable dyestuffs by coupling the same to coupling components containing water-solubilizing groups, such as sulfo or carboxy.

As suitable polydiazo-phthalocyanine compounds, any of those specifically mentioned above may be employed, as well as numerous other polydiazo-phthalocyanine compounds of the benzene series.

As coupling components suitable for the purpose of this invention come into consideration the various naphthol-sulfonic acids, amino-naphthol-sulfonic acids, aryl-pyrazolone-carboxylic acids, sulfo-aryl-pyrazolones, and the various substitution products of the amino-naphthol-sulfonic acids which are still capable of coupling, as for example acylamino-naphthol-sulfonic acids. As further specific examples of these, by way of illustration, the following may be named:

1-naphthol-4-sulphonic acid (Nevile and Winther)
1-naphthol-5-sulphonic acid (L acid)
1-naphthol-3:6-disulphonic acid
1-naphthol-3:6:8-trisulphonic acid
2-naphthol-6-sulphonic acid (Schaeffer)
2-naphthol-3:6-disulphonic acid (R acid)
2-naphthol-6:8-disulphonic acid (G acid)
1:8-dihydroxynaphthalene-3:6-disulphonic acid (Chromotrope)
1-amino-8-naphthol-4-sulphonic acid (S acid)
1-amino-8-naphthol-3:6-disulphonic acid (H acid)
2-amino-5-naphthol-7-sulphonic acid (J acid)
2-amino-8-naphthol-6-sulphonic acid (gamma acid)
1-m-sulfophenyl-3-methyl-5-pyrazolone
1-acetylamino-8-naphthol-3,6-disulfonic acid As the coupling involves a reaction between one molecule of a tetradiazo-compound and as high as four molecules of coupling component, it is possible to use as coupling components the naphthol- or amino-naphthol-sulphonic acids in various ways; that is, different coupling components may be mixed in a variety of proportions, or the coupling may be caused to take place by stages, with different coupling components.

The dyestuffs of the invention, extending on his principles the classification of Winther, Patente der organischen Chemie, Giessen, 1908, vol. II, Table, may be termed wholly primary tetrakisazo dyestuffs. However, quantitative coupling determinations have shown that the coupling often does not go to completion. Apparently, some of the diazo groups undergo decomposition during the coupling step, with the result that the final dyestuff is a mixture of primary disazo, trisazo and tetrakisazo compounds.

The compounds of this invention may therefore be expressed by the general formula Q—(N=N—A)$_x$, wherein Q is the radical of a phthalocyanine compound of the benzene series, A is an azo coupling component containing water-solubilizing groups, while $x$ is an integer not greater than 4, and more commonly probably 2 to 4.

The coupling is carried out in alkaline or neutral medium; and in the case of the aminonaphthol sulphonic acids, also in acid medium.

Phthalocyanines not substituted in the outer rings are intensely colored, usually blue, but as substituents are introduced into the outer rings the shade tends to become greener and may become quite green. It was not to be expected that the products of the present invention would have technically valuable violet, brown and blue shades.

Furthermore, the products of the invention have been found to possess direct affinity for cotton and regenerated cellulose.

The novel compounds may also be converted into lakes, by treatment for instance with barium chloride or other agents generally employed for the laking of dyestuffs containing sulfo or carboxy groups.

The invention is illustrated but not limited by the following examples in which the parts are by weight.

Example 1

30 parts of copper tetra-(4)-aminonaphthalocynanine are stirred with 20 parts of sodium nitrite and 500 parts of water. To this mixture are quickly added 500 parts of 33% aqueous hydrochloric acid at below 8° C. After a few minutes stirring a clear deep green diazo solution is obtained. This tetra-diazo solution is gradually added to 76 parts of 1-naphthol-3:6:8-trisulphonic acid dissolved in 1000 parts of water. During the addition the mixture is kept alkaline by adding sodium carbonate solution as needed. When coupling is complete the solution is heated and sufficient common salt is added to precipitate the dyestuff. It is filtered off, washed with 5% aqueous solution of common salt, dried and pulverised. The product is a dark powder, soluble in water to give a reddish-violet solution from which cotton is dyed at the boil in violet shades.

Other combinations prepared in similar manner to Example 1 are shown in the following table:

| Example | Coupling component (4 molecular proportions) | Shade of the resulting azo dyestuff |
|---|---|---|
| 2 | 2-naphthol-6:8-disulphonic acid | Dark-blue. |
| 3 | 2-naphthol-3:6-disulphonic acid | Red-violet. |
| 4 | 2-naphthol-8-sulphonic acid | Do. |
| 5 | 2-amino-5-naphthol-7-sulphonic acid | Do. |
| 6 | 1:8 - dihydroxynaphthalene - 3:6 - disulphonic acid. | Violet. |

Example 7

A paste containing 2 parts of finely divided copper tetra-4-aminophthalocyanine and 67 parts of water is added with stirring to 31 parts of 33% aqueous hydrochloric acid. To the mixture is quickly added 13 parts of a 10% aqueous solution of sodium nitrite with stirring, the temperature being kept at 10-12° C. After one and a half minutes the clear deep green diazo solution is rapidly added with good stirring to a solution of 4.55 parts of 8-acetylamino-1-naphthol-3:6-disulphonic acid in 200 parts of water. During the addition the mixture is kept alkaline by addition of sodium carbonate as needed and the temperature is kept below 5° C. When coupling is complete the solution is heated and sufficient common salt added to precipitate the dyestuff. It is filtered off, washed with 20% aqueous solution of common salt, dried and pulverised. The product is a dark powder, soluble in water to give a reddish-violet solution from which cotton is dyed at the boil in violet shades. It is believed to be a mixture of the tetrakisazo, trisazo and disazo derivatives of copper phthalocyanine and the named coupling component.

Other combinations prepared in a similar manner to Example 7 are shown in the following table:

| Example | Coupling component (4 molecular proportions) | Shade of the resulting azo dyestuff |
|---|---|---|
| 8 | 1-naphthol-4-sulphonic acid | Red-violet. |
| 9 | 8-naphthol-2-amino-6-sulphonic acid | Blue-grey. |
| 10 | 1-naphthol-8-p-toluene sulphonyl-amino-3:6-disulphonic acid | Violet. |
| 11 | 8-naphthol-2-β-hydroxyethyl-amino-6-sulphonic acid | Blue-grey. |
| 12 | 1-m-sulfophenyl-3-methyl-5-pyrazolone. | Yellow-green. |

Example 13

Cobalt-tetra-4-amino-phthalocyanine (2 grams in the form of a 10% paste) is pasted with 26.5 parts of 10 normal hydrochloric acid and is then azotized at about 10° C. with 13 parts of 10% sodium nitrite. This solution is then added to a solution at 5° C. of 1-acetyl-amino-8-naphthol-3,6-disulfonic acid (7.2 parts) in the presence of sufficient sodium carbonate to maintain distinct alkalinity on brilliant yellow papers at all times. This product dyes cotton in violet shades.

In a similar manner, copper-tetra-3-amino-phthalocyanine and metal-free-tetra-4-amino-phthalocyanine have been azotized and coupled under alkaline conditions with oxy-Koch acid (1-naphthol-3,6,8-trisulfonic) and acetyl-H acid (1-acetylamino-8-naphthol-3,6-disulfonic). The shades obtained were similar to those obtained from copper-tetra-4-amino-phthalocyanine with the same coupling components.

As already indicated, the above dyestuffs may be readily converted into lakes by treatment with barium chloride or similar agents. The following additional examples illustrate this phase of the invention.

Example 14

166.3 parts of the dyestuff obtained by tetra-diazotizing copper - tetra - 4 - amino-phthalocyanine and coupling to 4 moles of 1-naphthol-4-sulphonic acid (as the sodium salt) are dissolved in water. To this dye solution there is added an aqueous solution of 62.4 parts of barium chloride in 650 parts of water. The product precipitates out in the form of its barium lake, is filtered off, and dried. These pigments may be formed in the presence of a white pigment such as aluminum hydrate or barium sulfate. The shade of such a product, when dispersed in a vehicle and applied to a card, gives a very dull violet shade with good light fastness.

In place of barium chloride as the laking metal, other water-soluble barium salts may be used. In place of barium salts, water-soluble calcium or strontium salts may be substituted.

In the following table are shown the shades obtained in similar manner from various other phthalocyanine-azo dyes, using barium salts as the laking agent. In all cases, the tetra-diazo compound was prepared from copper-tetra-4-amino-phthalocyanine.

| Example | Coupling component (4 molecular proportions) | Shade of dispersed lake on card |
|---|---|---|
| 15 | 2-naphthol-3,6-disulfonic acid | Dull-violet. |
| 16 | 1,8-dihydroxy-naphthalene-3,6-disulfonic acid | Blue-grey. |
| 17 | 2-naphthol-6,8-disulfonic acid | Grey. |
| 18 | 1-naphthol-3,6,8-trisulfonic acid | Dull-purple. |
| 19 | 1-acetylamino-8-naphthol-3,6-disulfonic acid | Blue-violet. |
| 20 | 1-p-toluene-sulfonylamino-8-naphthol-3,6-disulfonic acid | Dull-violet. |
| 21 | 3-(β-hydroxy-ethyl)-amino-5-naphthol-7-sulfonic acid | Dull blue-green. |

The column of shades in the above table gives the shades obtained in each case by diluting the lake with a standard proportion of white pigment, dispersing in a vehicle and smoothing out on a white card as is customary for shade and light-fastness determination.

As many apparently widely different embodiments of this invention may be made without departing from the spirit and scope thereof, it is to be understood that I do not limit myself to specific embodiments except as defined in the appended claims.

I claim:

1. A water-soluble dyestuff consisting of a phthalocyanine molecule coupled by azo bridges onto azo-coupling components selected from the group consisting of the naphthol-sulfonic acids, the amino-naphthol sulfonic acids, the aryl-pyrazolone-carboxylic acids, the sulfo-aryl-pyrazolones and the N-substituted amino-naphthol-sulfonic acids.

2. A dyestuff of the general formula $$Q-(N=N-A)_x$$

wherein Q is the radical of a phthalocyanine compound of the benzene series, A is an azo coupling component selected from the group consisting of the naphthol-sulfonic acids, the amino-naphthol sulfonic acids, the aryl-pyrazolone-carboxylic acids, the sulfo-aryl-pyrazolones and the N-substituted amino-naphthol-sulfonic acids while $x$ is an integer not less than 2 and not greater than 4.

3. A water-soluble derivative of copper-phthalocyanine consisting of a copper-phthalocyanine molecule coupled by azo bridges to azo-coupling components selected from the group consisting of the naphthol-sulfonic acids, the amino-naphthol sulfonic acids, the aryl-pyrazolone-carboxylic acids, the sulfo-aryl-pyrazolones and the N-substituted amino-naphthol-sulfonic acids.

4. A dyestuff of the general formula $$(CuPc)-(N=N-A)_x$$

wherein CuPc designates the radical of copper-phthalocyanine, A is an azo coupling component selected from the group consisting of the naphthol-sulfonic acids, the amino-naphthol sulfonic acids, the aryl-pyrazolone-carboxylic acids, the sulfo-aryl-pyrazolones and the N-substituted amino-naphthol-sulfonic acids while $x$ is an integer not less than 2 and not greater than 4.

5. The water-soluble azo dyestuffs obtainable by a process comprising coupling water-soluble tetra-diazotized tetraaminophthalocyanines of the benzene series with azo coupling components selected from the group consisting of the naphthol-sulfonic acids, the amino-naphthol sulfonic acids, the aryl-pyrazolone-carboxylic acids, the sulfo-aryl-pyrazolones and the N-substituted amino-naphthol-sulfonic acids.

6. The water-soluble azo dyestuffs obtainable by a process comprising coupling tetra-diazotized copper tetra-(4)-amino-phthalocyanine with four moles of an azo coupling component selected from the group consisting of the naphthol-sulfonic acids, the amino-naphthol sulfonic acids, the aryl-pyrazolone-carboxylic acids, the sulfo-aryl-pyrazolones and the N-substituted amino-naphthol-sulfonic acids.

7. Process for the manufacture of water-soluble azo dyestuffs comprising coupling water-soluble tetra-diazotized tetra-aminophthalocyanines of the benzene series with azo coupling components selected from the group consisting of the naphthol-sulfonic acids, the amino-naphthol-sulfonic acids, the aryl-pyrazolone-carboxylic acids, the sulfo-aryl-pyrazalones and the N-substituted amino-naphthol-sulfonic acids.

8. A process for the manufacture of water-soluble dyestuffs of the phthalocyanine series, which comprises diazotizing tetra-amino-copper phthalocyanine and coupling the resulting polydiazo compound with a coupling component selected from the group consisting of the naphthol-sulfonic acids, the amino-naphthol-sulfonic acids, the aryl-pyrazolone-carboxylic acids, the sulfo-aryl-pyrazolones and the N-substituted amino-naphthol-sulfonic acids.

9. The water-insoluble alkaline-earth metal-salts of the dyestuffs defined by claim 2.

10. The barium lake of a dyestuff as defined in claim 5.

11. The barium lake of a dyestuff as defined in claim 6.

NORMAN HULTON HADDOCK.

CERTIFICATE OF CORRECTION.

Patent No. 2,351,118.                                                June 13, 1944.

NORMAN HULTON HADDOCK.

It is hereby certified that error appears in the printed specification of the above numbered patent requiring correction as follows: Page 1, first column, line 49, for "di-didiazo" read --di-diazo--; and that the said Letters Patent should be read with this correction therein that the same may conform to the record of the case in the Patent Office.

Signed and sealed this 29th day of August, A. D. 1944.

(Seal)

Leslie Frazer
Acting Commissioner of Patents.